United States Patent

Zyk

[15] 3,644,177
[45] Feb. 22, 1972

[54] MONITORING PENICILLIN IN BIOLOGICAL SUBSTANCES

[72] Inventor: Naomi Zyk, Jerusalem, Israel
[73] Assignee: Yissum Research Development Company, Jerusalem, Israel
[22] Filed: Nov. 12, 1969
[21] Appl. No.: 875,667

[52] U.S. Cl. .....................................................195/103.5 R
[51] Int. Cl. ......................................................G01n 31/14
[58] Field of Search..................................195/103.5; 424/26

[56] References Cited

OTHER PUBLICATIONS

Citri et al., " Biochem. Biophys. Acta" 92:572– 581 (1964).

Primary Examiner—A. Louis Monacell
Assistant Examiner—Max D. Hensley
Attorney—Browdy and Neimark

[57] ABSTRACT

A method of determining the penicillin content in biological, metabolic, and alimentary substances by partially inactivating penicillinase with iodine in the presence of and in proportion to the amount of a penicillin contained in a specimen, and measuring the residual activity of the enzyme by contact with a suitable substrate such as an S-type penicillin in the presence of an indicator whose color change signifies accumulation of the hydrolyzate penicillinoic acid and is correlated in terms of time or hue to a standardized amount of the penicillin under test. Monitoring strips for carrying out the procedure consisting of 2 sorbefacient pads one of which is impregnated with the test enzyme while the other is suffused with an S-type penicillin and an indicator which may be a soluble starch-iodine complex or a pH-sensitive organic dye.

17 Claims, 6 Drawing Figures

PATENTED FEB 22 1972                                    3,644,177

INVENTOR.

BY
*Browdy and Neimark*
ATTORNEYS

MONITORING PENICILLIN IN BIOLOGICAL SUBSTANCES

This invention relates to the qualitative determination and semiquantitave measurement of penicillin in biological substances, such as blood, urine, and milk. It is also applicable to monitoring the presence and approximate proportions of penicillin in vaccines, biological culture systems, medicinal preparations, foodstuffs, and many other organic materials in which penicillin may be found as a component either as a result of processing or of transmission from previous generative stages.

One of the principal and most useful applications of our testing method lies in the field of antibiotic therapy, both human and veterinary, where penicillin is administered as the antibiotic of choice. There is a critical and imperative need for a diagnostic procedure by which the blood level of penicillin can be determined in a sensitive, expeditious, and distinctive manner. Patients under continued penicillin therapy require diligent checking of their blood levels so as to avoid an excess or insufficiency of dosage. Similar attention is needed in cases of prolonged precautionary therapy, such as rheumatic fever, where the patient's compliance with the physician's orders of oral self-medication must be ascertained. In other instances, again, absorption of the antibiotic into the bloodstream may be actually blocked for a number of reasons and its presence or absence therein must be established without delay.

The best diagnostic procedure currently available consists in a microbiological sensitivity test which calls for the preparation of cultures, their incubation and sequential dilutions of the assay sample. It is a tedious process and requires from 18-24 hours before a reading can be secured. In contradistinction, the method of the present invention provides an almost instantaneous guide in the determination of the blood level at which the antibiotic has accrued in the system.

It is known that the enzyme penicillinase which is abundantly elaborated by certain strains of Eschericia coli and other gram-negative as well as gram-positive organisms like *Staphylococcus aureus*, antagonizes the antimicrobial action of penicillin by destroying its beta-lactam linkage and converting it into the inactive penicillinoic acid.

Depending on their reactivity to penicillinase, natural as well as semisynthetic penicillins can be classified as A- or S-type compounds. All A-type penicillins carry R— groups capable of protecting the vital beta-lactam ring, are relatively resistant to penicillinase and furthermore sensitize the enzyme to iodination. Accordingly penicillinase elaborated by *B. cereus, B. licheniformis,* or *B. subtilis* is inactivated by iodine in the presence of an A-type penicillin under appropriate conditions. Representative of this group are Methicillin, also known under the name of Celbenin, Dimocillin, and Staphcillin, Oxacillin sometimes referred to as Prostaphlin and Resistopen, and Cloxacillin or Orbenin.

In contrast all S-type penicillin are readily inactivated by penicillinase and stabilize that enzyme against iodination. Examples of S-type penicillins are benzyl-penicillin or Penicillin G, Phenoxymethyl-penicillin also known as Penicillin V and Pen-Vee, Phenethicillin known as Alpen and Broxil, and Ampicillin or Penbritin.

Falling in the category of enzyme-resistant antibiotics are also the cephalosporins. While, however, the structural distinction between A- and S-type penicillins is essentially based on the nature of the side chain in the molecule, cephalosporins owe their stability to the nucleus and therefore do not require the sidechain protection to withstand the action of penicillinase. Typical cephalosporins are the semisynthetic derivatives of Cephalosporin C or Keflin, Cephaloridin, or Ceporin, and Cephaloglycin or Kefglycin.

In accordance with the present invention our new diagnostic method is based on the observation that the aforesaid A-type penicillins carry side chains which cause an unmasking effect upon certain groups of the active site of penicillinase. The intensity of this effect depends, inter alia, upon the amount of the antibiotic which is encountered by the enzyme. This phenomenon is called "conformative response" in that the transitional "conformation" of the modifiable sites of the enzyme molecule "responds" to the presence of the antibiotic. The "conformative response" is measurably reflected in the exposure of iodine-sensitive regions of the penicillinase which can thus be inactivated in the presence of such penicillins. The iodination of a given amount of penicillinase in the presence of an A-type penicillin will accordingly inactivate a portion of the enzyme and the rate of inactivation under suitable conditions will be proportional to the concentration of the antibiotic present in the sample to be assayed. In consequence, the residual activity of the noniodinated enzyme portion will provide a measure of the penicillin level in the test specimen. It is established by contacting the iodine-treated enzyme with a competitive S-type penicillin substrate such as benzylpenicillin, which is broken down to penicillinoic acid. The latter combines with iodine to form a colorless complex so that the decolorization of a starch-iodine complex, for instance, may be used as an indicator in the testing procedure. The time required for reaching the end point is a function of the type and concentration of the penicillin present in the specimen. The higher the blood level of the drug, the lower the residual active content of the penicillinase and consequently the longer the time required to effect decolorization. Instead of the starch-iodine complex a pH-sensitive dye may be employed as an indicator to mark the terminal point of the enzymatic reaction with the benzylpenicillin substrate. Reagents advantageously used for this purpose are, e.g., bromophenol red, bromothymol blue and the like which are appropriate to the range of pH 5 to 7.

The color changes signifying the depletion of all remanent enzymatic potency and the corresponding accrual of penicillinoic acid are correlated with a standardized chart for given amounts of specified penicillins and the readings may be expressed either in terms of time or hues of a chromatic scale. Other conventional equipment to measure the time of color change, such as a spectrophotometer, may likewise be employed.

Based upon the same principle the procedure can be easily adapted to the determination of S-type penicillins and cephalosporins in biological samples. To this effect a predetermined amount of A-type penicillin is included in the penicillinase reagent and the estimated amount of S-penicillin or cephalosporin in the test sample is gauged by the measure of protection they afford against iodination. In all such cases the blotting strip or its equivalent test solution as illustrated in the following Examples 2 and 3 will contain S-type penicillin.

As a further modification, the penicillinase in the test strip may be replaced by a beta-lactamase of different specificity, for instance by cephalosporinase. The testing procedure is based upon the identical concept, except that the blotting strip or its equivalent test solution contains a suitable readily hydrolyzable substrate such as cephaloridine.

The following examples will serve the purpose of a more detailed understanding of the present invention and its preferred embodiments.

EXAMPLE 1

Blood Test for Penicillin

This simple bedside test requires the following reagents which may be provided in a ready made set or kit for convenient clinical use and instant availability.

1. An iodinating solution,
2. A test strip impregnated with penicillinase,
3. A blotting strip suffused with benzylpenicillin and a starch-iodine indicator,
4. A reference chart for correlating the readouts with standardized values for a given penicillin at specified concentrations.

The iodinating solution (1) may be advantageously composed of the following ingredients:

| | % v/v |
|---|---|
| Tris-buffer 0.25 M, pH 7.4 | 5 |

| | |
|---|---|
| Iodine 0.25 M dissolved in 1.25 M of KI | 15 |
| Urea 10 M | 35 |
| Sodium chloride (0.85%) | 45 |
| Total: | 100 |

The test strip (2) may be prepared by impregnating a Whatman No. 3 filter paper with a solution consisting of the following ingredients:

| | % v/v |
|---|---|
| Citrate-phosphate buffer 0.1 M, pH 4.4 | 50 |
| Gelatine (10% solution) | 10 |
| Penicillinase (20,000 units/ml.) | 10 |
| Soluble starch (5% solution) | 20 |
| Water | 10 |
| Total: | 100 |

The penicillinase enzyme listed in the foregoing composition may be prepared from a constitutive pencillinase forming mutant of any of the following organisms which prior to the filing of this application were deposited at the American Type Culture Collection at 12301 Park Lane Drive, Rockville, Md., where they can be obtained freely and without applicants' permission or dispensation by any interested person:

*Bacillus cereus* ATCC 10876 (inducible)
*Bacillus cereus* ATTC 10876 (a constitutive mutant of former)
*Bacillus subtilis* ATTC 9799
*Bacillus licheniformis* ATTC 9789

Instead of the mutants the inducible wild strains of the organisms may be used in which case the medium is supplemented with a suitable inducing agent, such as methicillin in an amount of 1.0 micrograms/ml. for *B. cereus* or 0.1 micrograms/ml. for the other strains.

A nutrient medium consisting of the acid hydrolyzate of 190 g. casein, 114 g. Na-citrate and 57 g. $KH_2PO_4$ is made up to 19 liters and placed in a 40-liter stationary glass fermenter provided with a glass assembly for forced aeration. The pH of the medium is adjusted with NaOH to about 7.2 and the fermenter and the medium are sterilized in an autoclave at 15 lb./sq. in. for about 90 minutes. After cooling the medium is added with 1 liter of a sterile solution containing $MgSO_4$ (M/30) and $FeSO_4$ (M/1000). The medium is thereupon inoculated with about 500 ml. of a shaker flask culture of one of the aforecited organisms which was previously prepared by seeding a peptone broth with spores of the mutant strain. The peptone broth consists of 1 percent bacteriological peptone, 0.3 percent meat extract and 0.2 NaCl and is autoclaved in the conventional manner. After inoculation the 20 liter culture is incubated at about 35° C. During the incubation sterile air is pumped through the air diffusion assembly. Samples are taken for assay of penicillinase activity and the incubation is continued until a suitable enzyme level has been reached. This requires between 8 and 10 hours and the process yields approximately 5,000 units per ml. The enzyme is thereupon concentrated and purified by treating the culture with 320 g. of infusorial earth at a pH of about 5, filtering the mixture through an infusorial earth filter bed which retains over 90 percent of the enzyme. The filter cake is now washed with water and eluted with an alkaline aqueous solution of 1 M NaCl and 0.1 M Na-citrate. A total of about 1½ liters of the eluent is used. The eluate is collected in small batches of which the first few (about 200 ml.) and the last one (about 150 ml.) are discarded. Practically all of the enzyme is now contained in about 1 liter of the clear eluate. The same is now subjected to dialysis against three changes of 0.001 M phosphate buffer with a pH of 7 following which the solution is concentrated in vacuo to about one-tenth of its volume. After dialysis against 0.001 M phosphate buffer with a pH of 7 the solution may be lyophilized for storage.

The blotting strip (3) consists of Whatman No. 3 filter paper which is suffused with a solution containing the following ingredients:

| | % v/v |
|---|---|
| Iodine 0.25 M dissolved in 1.25 M KI | 10 |
| EDTA 1.0 M | 10 |
| Citric Acid 1.0 M | 10 |
| Soluble starch (5% solution) | 20 |
| Benzylpenicillin (100,000 units/ml.) | 10 |
| Water | 40 |
| Total: | 100 |

The mixture is adjusted to a pH of 6.4.

The reference chart (4) may be exemplified by the following Table I of standardized decoloration times in a starch-iodine system for the antibiotic Orbenin, also known as Cloxacillin and under the generic name of 5-methyl-3-o-chlorophenyl-4-isoxazolyl penicillin.

TABLE I

| Decolorization Time (seconds) | Concentration of Orbenin (micrograms/ml.) |
|---|---|
| <150 | 0 |
| 150–200 | 0–1 |
| 200–250 | 1–2 |
| 250–300 | 2–5 |
| 300–400 | 5–10 |
| 400–600 | 10–20 |
| >600 | >20 |

For carrying out the diagnostic procedure reference is made to the accompanying drawings which show an expedient embodiment of the test.

Figure 1:
FIG. 1 represents a schematic view of test strip (2), comprising a handle 1 of wood, plastic or other suitable material which is capped by paper wad 2 carrying the enzyme reagent in accordance with the aforesaid test strip formulation No. 2.
Figure 2:
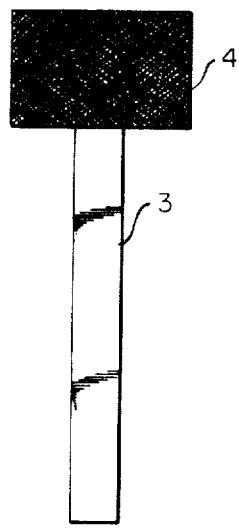
FIG. 2 shows the blotting strip comprising handle 3 which is crested with paper wad 4 impregnated with the aforedescribed blotting solution No. 3.
Figure 3:
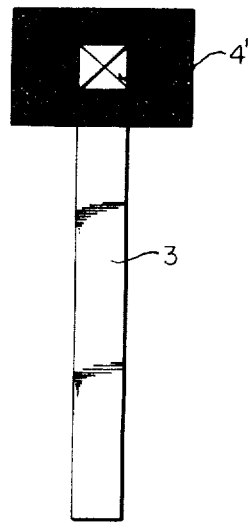

FIG. 3 displays the blotting strip after the color change has been effected by superimposition of the test strip. For the sake of distinctness the blotting strip shows square mark 4' which is printed or stamped on the filter paper in brown-black ink to blend with the color of the strip. The mark becomes visible upon decolorization to indicate the endpoint of the reaction.

Figure 4:
Figure 5:
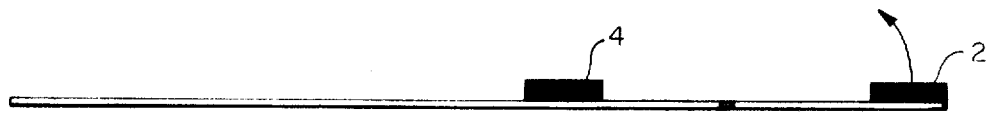

In conformity with another form of the invention FIG. 4 represents the top view of a pliable strip of plastic material which is tipped by test pad 2 and provided with blotting pad 3 at an appropriate distance. Equidistantly between the two pads the strip is notched so as to form a neck 5—5' and permit pad 2 to fold over and be superposed over pad 4. FIG. 5 is a side view of the monitor strip before and FIG. 6 after the contact between the test and blotting pads.

By means of the foregoing reagents and implements the performance of the monitoring test comprises the following simple procedural steps. One drop of blood is withdrawn from the patient and diluted with four drops of the iodinating solution No. 1 with vigorous shaking. Test strip No. 2 is then dipped into the mixture for approximately 30 seconds during which the enzyme is saturated with iodine and inactivated in an amount proportionate to the amount of the drug contained in the blood specimen. The test strip is thereupon rinsed in a saline solution to remove excess iodine and blotted by contact with the blotting strip which activates the residual potency of the penicillinase. The substrate benzylpenicillin in the blotting strip diffuses into the test strip to be hydrolyzed to penicillinoic acid which in turn combines with the iodine of the starch-iodine indicator to form a colorless complex, thus causing decolorization of the blotting strip. The rate of decolorization, being a function of the rate of hydrolysis, thus measures the residual activity of the enzyme and reciprocally the blood level of penicillin. It may be gauged against a standardized chart 4 as previously explained.

In a case of a successful clinical application of our new diagnostic technique a healthy male adult was medicated with one capsule of Orbenin containing 250 mg. of the drug. Blood specimens of several ml. were obtained from his vein at intervals of 5 minutes, 1½ hours, and 2½ hours after oral administration. A small aliquot of each sample was transferred to three test tubes containing oxalate crystals while the remaining blood was permitted to coagulate for serum collection. The oxalated aliquot portions of the whole blood were labeled with coded symbols A, B, and C and tested with our monitor strip by a technician without previous experience nor knowledge of the nature of the specimens. The three sera were separately labeled in the identical fashion and independently analyzed by the conventional microbiological method. The following Table II records the comparative results.

TABLE II

| Sample (Code) | Blood levels of Orebenin (microgms./ml.) | |
|---|---|---|
| | Strip Test | Microbiological Test |
| A | 5-10 | 7.5 |
| B | 0 | 0 |
| C | 2-4 | 2.4 |

As evidenced by the tabulated readings the validity, meaningfulness and adequacy of the strip monitoring test for all practical purposes falls noways short of the bacteriological assay method. It has however a number of advantages which make it decidedly preferably over the conventional current technique. An outstanding feature of our monitoring procedure is the facility and speed with which it can be carried out. While in accordance with standard practice a blood sample has to be sent to a microbiological diagnostic laboratory and requires a period of 18 hours for a report, our monitor strips develop the chromographic answer within 2 to 10 minutes, and practically at the patient's bedside. No particular skill or training of the operator is required. Furthermore, only one drop of blood (0.05 ml. or less) is needed to conduct the test while the microbiological assay calls each time for at least 2.0 ml. of a venous withdrawal. Finally, it is of utmost value and importance that our new diagnostic procedure by the nature of its test strip reagent has penicillin specificity while the bacteriological assay is nondifferential with respect to other antibiotics. With our method it is therefore possible to measure the blood level of penicillin in patients who receive additional antibiotics at the same time.

EXAMPLE 2

Urine Test for Penicillin

Based on the identical principle as heretofore explained penicillin can also be monitored in the urine by a slight modification of the test. For this purpose the iodinating solution has the following approximate composition:

| | % v/v |
|---|---|
| Iodine 0.25 M dissolved in 1.25 M of KI | 15 |
| Phosphate buffer 10 M pH 8 | 5 |
| Urea 10 M | 35 |
| Sodium chloride (0.85%) | 45 |
| Total: | 100 |

The test strip is prepared in a similar manner as that for the blood assay except that the penicillinase is derived from *B. Subtilis* or *B. licheniformis*.

Instead of the blotting strip a test solution is employed which contains:

| | % v/v |
|---|---|
| Benzylpenicillin (10,000 units/ml.) | 10 |
| EDTA 1.0 M | 10 |
| Citric acid | 10 |
| Water | 70 |
| Total: | 100 | adjusted to a pH of 6.4.

One drop of the iodinating solution is added to one drop of urine. The enzyme strip is dipped into the mixture for 3 minutes. Thereupon one drop of the test solution is added to the mixture and the time for decolorization of the enzyme strip inserted in that mixture is measured in reference to a standard chart.

EXAMPLE 3

Milk Test for Penicillin

The same reagents are used as in Example 2. For the purpose of assay, one drop of milk is placed on a white porcelain tile and mixed with one drop of iodinating solution. The enzyme strip is immersed in the mixture for about 2 minutes. Two drops of the test solution are thoroughly mixed in and the time required for the decolorization is noted and interpreted by reference to a standard chart.

It will be understood by a skilled worker in the art that divers modifications and variations may be resorted to in formulating the reagents as used within the scope and concept of the present invention. Thus, for instance, in the iodinating solution (1) of Example 1 the Tris-buffer may be substituted by other equivalent buffer agents in concentrations of 0.1 to 0.5 M in the alkaline range, preferably a pH between 7.3–8.5. Likewise, the molar ratio of the potassium iodide to iodine may vary from 5 to 20. If the iodine is used in the form of a water-soluble "iodophor" or similar complex, the iodide may be altogether omitted. The inclusion of urea is not absolutely essential as its function in the range of 2 to 5 M is merely to improve the sensitivity of the composition. Urea may be replaced by other hydrogen-bond disrupting agents such as guanidine hydrochloride in a strength of 0.3 to 0.8 M. The sodium chloride in the formula has been added to equalize the osmotic pressure. It may be exchanged for another isotonic neutral salt or sugar solution.

In the test strip No. 2 of Example 1 the Whatman filter paper may be substituted by a matrix of any material with sufficient absorptive power for the enzyme and other ingredients. Instead of the citrate-phosphate buffer any other buffer agent at a level of 0.05 M to 0.3 M may be used in the acidic range, preferably within a pH of 4.0 to 5.0.

In the blotting strip (No. 3) of Example 1 the EDTA-citric acid combination may be replaced by other chelating agents at a ratio of 0.05 to 0.5 M. These ingredients can be dispensed with if a stabilized benzylpenicillin or certain other S-type penicillins are used.

Figure 6:
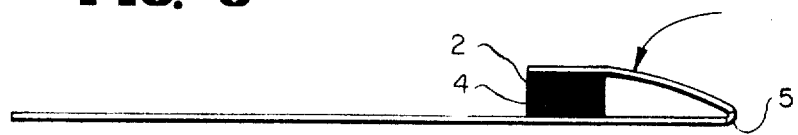

In using the single-strip embodiment of the invention as illustrated in FIGS. 4–6 it will be understood that special precautions be taken against a contamination of pad 2 with traces of S-type penicillin contained in pad 3.

What we claim is:

1. The method of monitoring the A-type penicillin content in biological, metabolic and alimentary substances which comprises the steps of
   1. obtaining a sample of such substances,
   2. iodinating a predetermined quantity of penicillinase in the presence of said sample,
   3. reacting a predetermined quantity of an S-type penicillin compound with said iodinated penicillinase in the presence of an indicator for said penicillinase activity until the appearance of a color change, and
   4. correlating said change in terms of time or hue with that of a standardized amount of the penicillin compound to be assayed.

2. The method of monitoring the A-type penicillin content in biological, metabolic and alimentary substances which comprises the steps of
   1. obtaining a sample of such substances,
   2. impregnating a sorbefacient penicillinase-carrying matrix with iodine in the presence of said sample.
   3. treating said matrix with a predetermined quantity of benzyl-penicillin in the presence of an indicator for said penicillinase activity until the appearance of a color change, and 4. correlating said change in terms of time or hue with that of a standardized amount of the penicillin to be assayed.

3. The method of determining the blood level of an A-type penicillin in a patient comprising the steps of
 1. withdrawing a blood sample from said patient,
 2. diluting said sample with an iodine solution,
 3. immersing a sorbefacient penicillinase-carrying test strip in said solution,
 4. rinsing said test strip in saline solution to remove excess iodine,
 5. contacting said test strip with a sorbefacient blotting strip carrying a predetermined quantity of an S-type penicillin in the presence of an indicator for said penicillinase activity until the appearance of a color change, and
 6. correlating said change in terms of time or hue with that of a standardized amount of the penicillin under assay.

4. The method in accordance with claim 3 in which the S-type penicillin compound of step 5 is benzyl-penicillin.

5. The method of determining the content of A-type penicillin in urine comprising the steps of
 1. mixing 1 drop of urine with one drop of an iodine solution of predetermined $I_2$ content,
 2. immersing a sorbefacient penicillinase-carrying test strip in said solution,
 3. adding one drop of a test solution containing a predetermined quantity of an S-type penicillin to said mixture, and
 4. correlating the evolving decolorization of the test strip in terms of time or hue with that of a standardized amount of the penicillin under assay.

6. The method of determining the content of A-type penicillin in accordance with claim 5 wherein the S-type penicillin of step 3 is benzyl-penicillin.

7. The method of determining the content of A-type penicillin in milk comprising the steps of
 1. mixing one drop of milk with one drop of an iodine solution of predetermined $I_2$ content,
 2. immersing a sorbefacient penicillinase-carrying test strip in said solution,
 3. adding two drops of a test solution containing a predetermined quantity of an S-type penicillin, and
 4. correlating the evolving decolorization of the solution in terms of time or hue with that of a standardized amount of penicillin compound under assay.

8. The method in accordance with claim 7 wherein the S-type penicillin of step 3 is benzyl-penicillin.

9. The method of monitoring the A-type penicillin content in biological, metabolic and alimentary substances which comprises the steps of:
 1. obtaining a sample of such substances,
 2. iodinating a predetermined quantity of a beta-lactamase enzyme in the presence of said sample,
 3. reacting a predetermined quantity of a cephalosporin with said iodinated β-lactamase in the presence of an indicator for said β-lactamase activity until the appearance of a color change, and
 4. correlating said change in terms of time or hue with that of a standardized amount of the penicillin under assay.

10. The method in accordance with claim 9 in which the beta-lactamase of step 2 is cephalosporinase.

11. The method in accordance with claim 9 in which the cephalosporin of step 3 is cephaloridine.

12. A monitoring set for the determination of the A-type penicillin content in biological, metabolic and alimentary substances comprising
 1. an iodine preparation providing an isotonic solution of iodine with an approximate pH of 7.4
 2. a test strip embodying a sorbefacient matrix impregnated with a given amount of penicillinase in a buffered medium of an approximate pH of 4.4, and
 3. a blotting strip embodying a sorbefacient matrix impregnated with an S-type penicillin in a buffered medium of an approximate pH of 6.4

13. A monitoring set in accordance with claim 12 wherein the sorbefacient matrix consists of Whatman No. 3 filter paper.

14. A monitoring set in accordance with claim 12 in which the S-type penicillin of said blotting strip is benzyl-penicillin.

15. A test strip adapted for use in a monitoring set in accordance with claim 12 comprising a sorbefacient material which is impregnated with a solution of approximately 20,000 units/ml. of penicillinase in a buffered medium of a pH between 4–5.

16. A blotting strip suitable for use in a monitoring set in accordance with claim 12 adapted for coaction with said test strip comprising a sorbefacient material which is impregnated with a solution of approximately 10,000 units/ml. of benzyl-penicillin, a chelating agent and an indicator for penicillinase activity, said solution being adjusted to a pH of approximately 6.4.

17. A diagnostic monitoring device of the determination of the A-type penicillin blood level in a patient, comprising a pliable strip of plastic material which is tipped with a sorbefacient pad member impregnated with a solution of approximately 20,000 units/ml. of penicillinase in a buffered medium within a pH range of 4–5, and, at a suitable distance therefrom, has attached thereto a second pad member prepared in accordance with claim 16, said strip being notched at an equidistant location between the two pads so as to facilitate their superposition.

* * * * *